A. F. GRAY.
Vapor-Burner.
No. 160,669.  Patented March 9, 1875.
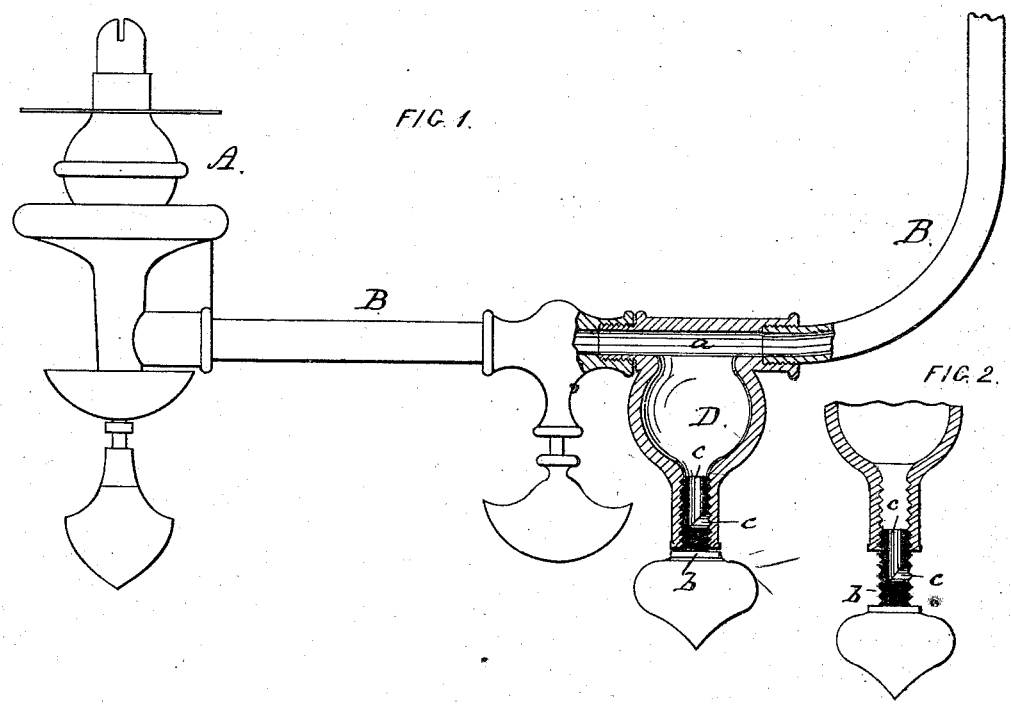
WITNESSES.
J. A. Pease
W. F. Dinsmore
INVENTOR.
A. F. Gray
Per Brown Brothers
Attorneys.

UNITED STATES PATENT OFFICE.

ALLEN F. GRAY, OF BOSTON, MASSACHUSETTS, ASSIGNOR TO HIMSELF AND SOLOMON S. GRAY, OF SAME PLACE.

IMPROVEMENT IN VAPOR-BURNERS.

Specification forming part of Letters Patent No. 160,669, dated March 9, 1875; application filed October 20, 1874.

*To all whom it may concern:*

Be it known that I, ALLEN F. GRAY, of South Boston, in the county of Suffolk and State of Massachusetts, have invented an Improvement in Vapor-Burners, of which the following is a specification:

This invention relates to vapor or naphtha burners; and it consists in the location of a trap for catching and retaining whatsoever water may be mixed with or condensed from the naphtha as the naphtha passes to the burner, preventing thereby its further passage, and holding it subject to ready removal whenever it may be necessary or desirable.

In the accompanying plate of drawings, Figure 1 is an elevation of a vapor or naphtha burner and of the feed-tube therefor, showing the water-trap in vertical section. Fig. 2 is a sectional view of the water-trap with its valve opened to empty it of its accumulated water.

In the drawings, A represents a vapor-burner, which may be of any of the ordinary classes, and B the feed-tube therefor. In the length of the feed-tube B is located a chamber, D, which projects from its under side, and is open to the passage $a$ through the tube, and makes a receptacle or trap for the water which may be mixed with or condensed from the naphtha, and the water, as it is of a greater specific gravity than the naphtha, settles at the bottom of said trap; $b$, a screw plug, having passage $c$ through it. This screw-plug $b$ enters the bottom end of the trap D, and it is provided for the purpose of emptying the trap of the water which has gathered in it, when it may be desired or necessary.

As shown in Fig. 1, the screw-plug holds the water in the trap against escape, and, as shown in Fig. 2, the water can be emptied through the passage $c$.

Having now described my invention, what I claim, and desire to secure by Letters Patent, is—

The water-trap D, in combination with a vapor-burner, all substantially as and for the purpose described.

ALLEN F. GRAY.

Witnesses:
 EDWIN W. BROWN,
 GEO. H. EARL.